United States Patent [19]

Barske

[11] Patent Number: 5,336,932
[45] Date of Patent: Aug. 9, 1994

[54] METHOD FOR CONTROLLING A GENERATOR

[75] Inventor: Heiko Barske, Grafelfing, Fed. Rep. of Germany

[73] Assignee: Audi AG, Ingolstadt, Fed. Rep. of Germany

[21] Appl. No.: 81,248

[22] PCT Filed: Nov. 26, 1991

[86] PCT No.: PCT/EP91/02233
§ 371 Date: Jun. 25, 1993
§ 102(e) Date: Jun. 25, 1993

[87] PCT Pub. No.: WO92/13380
PCT Pub. Date: Aug. 6, 1992

[30] Foreign Application Priority Data

Jan. 25, 1991 [DE] Fed. Rep. of Germany ....... 4102150

[51] Int. Cl.$^5$ .................. H02P 9/04; F02D 29/06
[52] U.S. Cl. ..................... 290/1 R; 290/51; 322/7
[58] Field of Search ............ 290/1 R, 51; 322/7

[56] References Cited

U.S. PATENT DOCUMENTS

| | | | |
|---|---|---|---|
| 4,062,419 | 12/1977 | Kodota | 290/38 E |
| 4,187,436 | 2/1980 | Etienne | 290/27 |
| 4,699,097 | 10/1987 | Tanaka et al. | 123/192.1 |
| 4,877,273 | 10/1989 | Wazaki et al. | 290/40 C |
| 5,077,516 | 12/1991 | Meyer | 322/7 |

FOREIGN PATENT DOCUMENTS

| | | |
|---|---|---|
| 0094685 | 11/1983 | European Pat. Off. . |
| 1438977 | 11/1968 | Fed. Rep. of Germany . |
| 2801053 | 7/1978 | Fed. Rep. of Germany . |
| 3104864 | 8/1982 | Fed. Rep. of Germany . |
| 3112629 | 10/1982 | Fed. Rep. of Germany . |
| 3150446 | 6/1983 | Fed. Rep. of Germany . |
| 3203240 | 8/1983 | Fed. Rep. of Germany . |
| 3729772 | 3/1989 | Fed. Rep. of Germany . |
| 3830603 | 3/1989 | Fed. Rep. of Germany . |
| 2495384 | 6/1982 | France . |
| 58-069403 | 4/1983 | Japan . |
| 61-015598 | 7/1984 | Japan . |
| 61-171839 | 8/1986 | Japan . |

OTHER PUBLICATIONS

Bosch's Automotive Engineering Handbook, 1986, 2nd Edition, p. 269 (English translation of 1984 German Edition).
Bosch's Automotive Engineering Handbook, 1984, 19th Edition, p. 269.

Primary Examiner—Jeffrey A. Gaffin
Assistant Examiner—Robert Lloyd Hoover
Attorney, Agent, or Firm—Jacques M. Dulin

[57] ABSTRACT

A method for controlling a generator associated with an internal combustion engine of a motor vehicle such that the generator is connected to provide electricity only under specific operating conditions. The method includes the following steps: (1) inputting engine consumption characteristic map values for various engine operating parameters to a logic module; (2) determining an operating point of the engine as defined by the operating map; (3) determining whether or not the operating point is less than or equal to a predetermined value; (4) connecting the generator to a load circuit associated with the motor vehicle if the operating point is at or falls below the predetermined value; and (5) disconnecting the generator from the load circuit if the operating point is greater than the predetermined value.

6 Claims, 2 Drawing Sheets

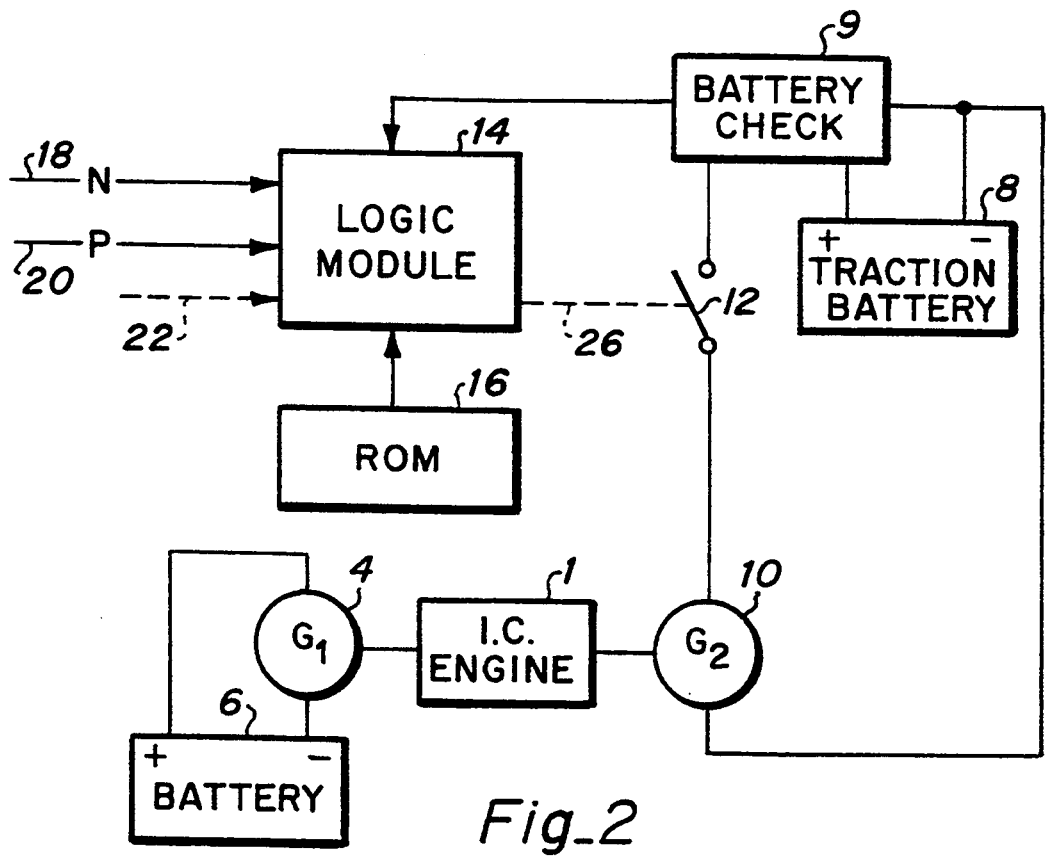
Fig_2

METHOD FOR CONTROLLING A GENERATOR

FIELD

The invention relates to a computer-based method for controlling a generator associated with an internal combustion engine, more specifically the method controls the generator such that it is operated to supply energy in accordance with predetermined operating conditions of the internal combustion engine as specified in an engine consumption characteristic map.

BACKGROUND

Modern motor vehicles driven by an internal combustion engine have, associated with them, a generator which is used to supply power for electrical current-consuming equipment, such as for example, lights, a radio, power windows, etc. In addition, a battery is provided to insure that sufficient power is available in times of peak power demand. Accordingly, the battery must be recharged periodically. Recharging is especially necessary after the battery is used to power the starter during the engine start -up procedure. The energy required for recharging the battery increases the fuel consumption of the motor vehicle.

Japanese patent abstract Volume 10, No. 381 (M-547) (2438) and JP-A-61-171839 disclose a method for controlling the generator associated with an internal combustion engine, wherein the generator is operated only during specific operating conditions of the internal combustion engine. Specifically, the generator is operated only when a "partial-lean control" cannot be effected.

French Patent document FR-A 2 495 384 discloses a vehicle battery charging circuit having a detector and a switch for selectively coupling/decoupling a generator (which is used for charging the battery) in accordance with either the charge state of the battery or predetermined engine operating conditions. Once the battery is fully charged, the detector generates an interrupt in the circuit. The interrupt shuts off the generator output to the battery thereby reducing the power taken by the generator which, in turn, improves the average efficiency of the engine. The switch is coupled to the throttle pedal in a manner such that the generator is permitted to charge the battery only at low throttle openings.

In spite of the methods and apparatus for controlling the operation of a generator disclosed in the prior art, there still remains a need to further reduce the total fuel consumption required to generate electrical energy in a motor vehicle.

THE INVENTION

Objects

It is therefore a primary object of the invention to provide a method for controlling the operation of a generator for charging a battery of a motor vehicle equipped with an internal combustion engine, wherein the fuel consumption required for power generation is reduced.

It is another object of the invention to provide a method for controlling a generator of the type herein described wherein the generator is selectively operated for charging the battery in accordance with selected operating points of the internal combustion engine as determined from an engine characteristic map stored in a memory associated with a microprocessor-based control unit for the engine.

These and other objects of the present invention will become apparent to those skilled in the art from the following detailed description of the preferred embodiment, drawings and appended claims.

SUMMARY

In a preferred embodiment of the present invention, the generator is caused to be electrically connected or disconnected from a load circuit depending on an operating point of the internal combustion (IC) engine as defined by an engine consumption characteristic map. In this manner, the power generated by the generator is synchronized with the operating point of the engine.

The engine consumption characteristic map comprises a series of lines which represent constant specific fuel consumption values, usually indicated in g/kWh, plotted against the engine's rotational speed and torque. A specific fuel consumption value is defined as the amount of fuel required to generate 1 kWh. An example of such an engine consumption characteristic map is found in Bosch's Automotive Engineering Handbook, 1984, 19th edition, page 269.

The present invention is based on the finding, outlined in greater detail below, that it is possible to optimize the fuel consumption associated with running the generator by selectively connecting the generator to the load circuits only at time periods when the engine is operating at pre-determined operating points as specified in the engine consumption characteristic map.

Surprisingly, the most favorable operating points in the engine consumption characteristic map for cost effectively connecting the generator are those points where the internal combustion engine is operating at low efficiency. In operating regions of low efficiency, the increased power requirements of the generator results in less fuel consumption than in those operating regions in which the internal combustion engine is operating at high efficiency.

In accordance with the conventional practice, the engine consumption characteristic map is stored in a memory, such as for example a read only memory or ROM, of the microprocessor-based engine control unit. From such readily available engine operating parameters as engine speed, transmission ratio, and load data, it is possible to determine a characteristic map point corresponding to an operating point of the internal combustion engine at any particular instant of time. Depending on the location of this characteristic map point, a decision may be made to either connect or disconnect the generator.

In accordance with the apparatus aspects of the invention, the generator is connectable, via a switch means, to an electrical load circuit associated with the motor vehicle. The generator is loaded (i.e., generating electrical energy) when it is connected to the load circuit. Alternately, the generator can be mechanically connectable to the engine and therefore operable to generate electricity when so connected and inoperable when not so connected.

The control unit of the engine includes a logic module which is responsive to a plurality of data inputs for receiving information concerning various engine operating parameters and is further operative to activate the switch means via an actuating means.

The logic module uses the information concerning the engine operation parameters to determine a particular characteristic map point of the engine consumption characteristic map at any particular time. Depending upon the location of a determined characteristic map point, the logic module will output a control signal to close or open the switch means for operating the generator.

While in the preferred embodiment, the generator is disclosed as being electrically disconnectable from the load circuit, the generator may be mechanically coupled or uncoupled from the engine.

A time factor is preferably incorporated into the process of the invention in order to avoid excessively switching the generator from a loaded to an unloaded state. The operating state leading to the connection or the disconnection of the generator from the load circuit must exist for a predetermined period of time before a switching command can be relayed to the switch means. In this manner, frequent connection and disconnection of the generator is avoided. A detecting means is used to determine the predominant operating state of the engine at any particular time. A hysteresis characteristic for connection and disconnection of the generator may also used to avoid excessively frequent switching.

In a preferred embodiment, it is provided that the charge level of the battery is simultaneously monitored by a conventional battery check circuit. This is to prevent the generator from being connected only in the desired regions if the battery has been discharged to an excessive degree. In such a case, the central absolute requirement is for the battery to be recharged.

The process described herein is particularly suitable for use in a hybrid vehicle which is driven under certain operating conditions, e.g. in urban traffic, by an electric motor and under other operating conditions, e.g. in interurban traffic, and at higher speeds by an internal combustion engine. In such hybrid vehicles which are known from the prior art, a first generator is provided for charging the battery(ies) which are utilized for electric motor operation. The battery(ies) for the electric drive is(are) sometimes referred to as "traction battery(ies)". This first generator for the traction battery(ies) is(are) usually independent and distinct from the generator used for supplying power to the normal battery associated with the I.C. engine as well as the other current-consuming equipment of the motor vehicle. This generally requires considerable quantities of electric charge to be made available so that, in this field especially, purposeful selection of the operating states in which the electric charge is to be generated by the internal combustion engine may lead to quite substantial savings in fuel.

DRAWINGS

The principle of the invention is described hereinafter with reference to the drawings in which:

FIG. 1 depicts an example engine consumption characteristic map illustrating the operating principle of the present invention; and FIG. 2 is a block diagram schematically depicting an apparatus for carrying out the method of the present invention.

DETAILED DESCRIPTION OF THE BEST MODE

Figure 1:
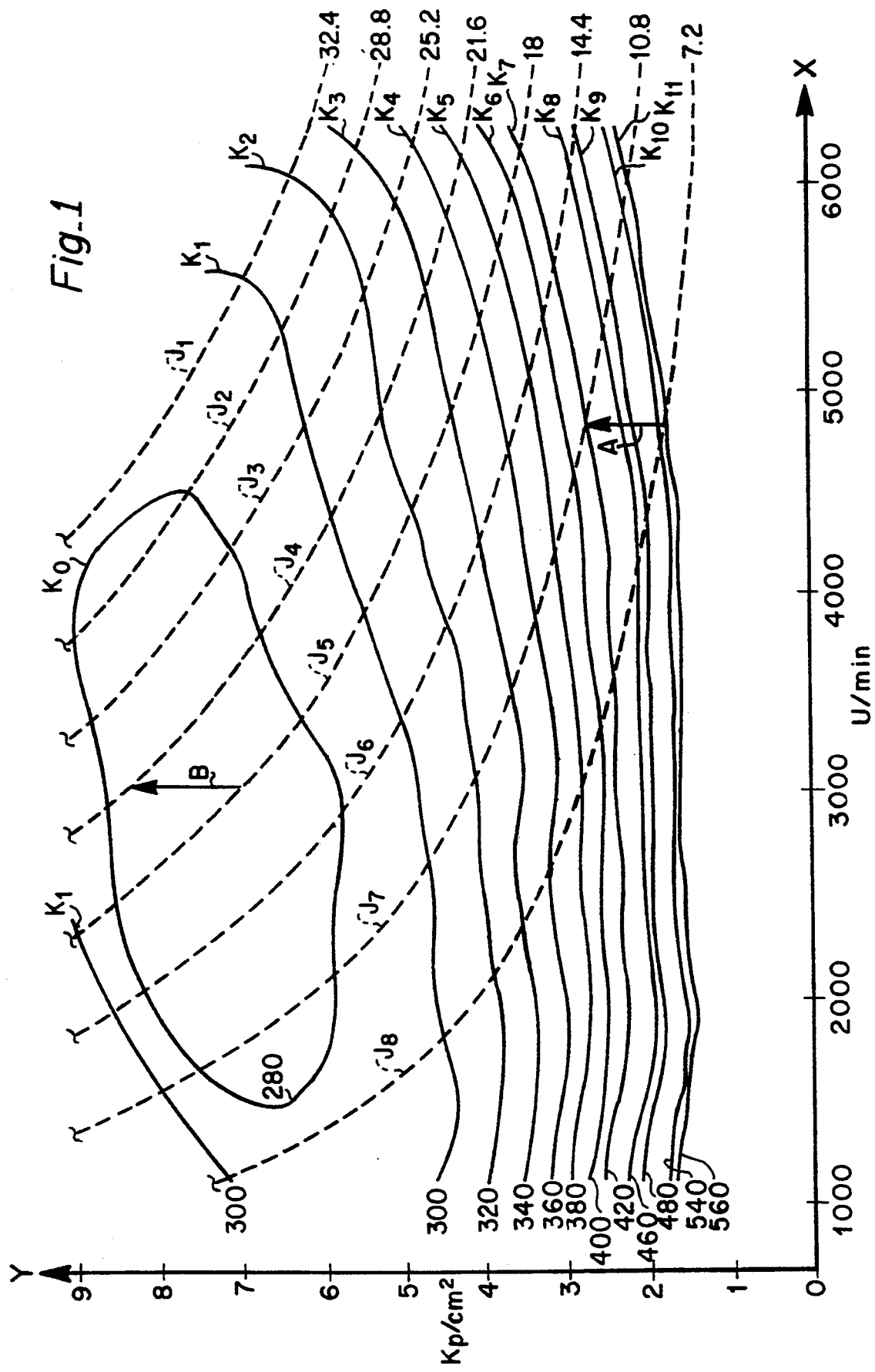

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 1 shows an engine consumption characteristic map of the type plotted, for example, for a 36 kW SI engine (or 48.26 hp CI engine). The rotational speed of the internal combustion engine is plotted in units on the X axis and the operating pressure acting on the piston, by means of which the engine torque can be easily determined, is plotted in $kp/cm^2$ on the Y axis.

In engine tests, fuel consumption is measured as a flow rate, that is mass flow per unit time $M_f$. The family of curves $k_1$–$k_{11}$ represents lines of identical specific fuel consumption (sfc), that is the fuel flow rate per unit power output. The specific fuel consumption (sfc) measures how efficiently an engine is using fuel supplied to do work:

$$sfc = \frac{Mf}{P}$$

The numbers indicated for $k_1$–$k_{11}$ are in the SI units of g/kWh and therefore indicate how much fuel is consumed to generate 1 kWh. For an efficient engine, low values of spc are desirable.

The family curves $J_1$–$_8$ are curves of identical power output, the numbers indicated are SI units of power, kW. The interval between successive output curves $J_1$–$J_8$ is 3.6 kW. Typically, the engine consumption characteristic may also include a family of road resistance lines which indicate the "road-load power" i.e., the power required to drive a vehicle on a level road at a steady speed. However, in order to simplify the graph, the road resistance lines in the various transmission ratios have been omitted since they are not necessary for an explanation of the present invention.

The case is now considered where connection of the generator increases the power demand of the internal combustion engine by 3.6 kW. This is expressed by the arrows A and B.

Arrow A lies in a region in which the internal combustion engine is being operated at relatively low efficiency, while arrow B lies in a region in which the internal combustion engine is being operated at high efficiency. The bottom end of each arrow A,B lies in a region on the map where the internal combustion engine alone is being operated. The point of arrow A lies on the point reached in the engine consumption characteristic map corresponding to where the generator has been connected and the power demand has been increased accordingly.

The fuel consumption (i.e., fuel flow rate $M_f$) of the internal combustion engine at the bottom end of the arrow A is determined from the formula:

$$sfc = \frac{Mf}{P}, \text{ or}$$

540 g/kWh · 7.2 kW = 3888 g/h.

At the working point shown by the point of the arrow A (i.e., where the generator has been connected) the fuel consumption of the internal combustion engine is 420 g/kWh·10.8 kW=4536 g/h.

Accordingly, the connection of the generator has resulted in an increase in the fuel consumption of 648 g/h. This corresponds to an excess fuel consumption of 180 g/h per 1 kW of required power output.

The same calculation for operating points illustrated by arrow B results in the following situation: when the internal combustion is operating at high efficiency and consuming only 280 g/kWh (i.e., at curve $K_0$), in the event of a power demand of 18 kW with the generator not connected, the following consumption is determined at the operating point corresponding to the bottom end of the arrow B:

280 g/kWh·18 kW=5040 g/h.

Connection of the generator leads to the power demand being increased by 3.6 kW, (i.e., the difference of $J_4$ and $J_5$ or 21.6 kW), so that the operating point illustrated by the point of the arrow B is then reached. The fuel consumption of the internal combustion engine is calculated as:

280 g/kWh·21.6 kW=6048 g/h.

The excess consumption for the power demand of the generator this time is 1008 g/h, i.e. 280 g/h per 1 kW motor output. In other words, the fuel required to generate the electric power is 50% higher at the high efficiency engine operating point B than it is at low efficiency engine operating point A.

Therefore, it is an essential point of the invention to disconnect the generator in those regions of the engine consumption characteristic map where it is relatively unfavorable to generate electrical power, i.e. in those regions where the internal combustion engine itself is being operated at high efficiency. Conversely, it is desirable to operate the generator only in those regions where the internal combustion engine is being operated at low efficiency, for it is in the regions of low efficiency for engine operation where additional electrical power may be obtained at a relatively low cost in terms of fuel consumption.

FIG. 2 shows a block diagram for effecting the method according to the invention. The block diagram is representative of a hybrid motor vehicle of the type which includes a first generator 4 for charging the normal battery 6 provided to the I.C. engine 1 and a second generator 10 for charging a battery 8 associated with the electric drive portion (not shown) of the hybrid vehicle. The battery 8 is sometimes referred to as a "traction battery". The charge level of the traction battery is monitored by a conventional battery check circuit, shown here schematically as block 9.

The generator 10 may be activated or deactivated by a switch 12 so that it is loaded when the switch 12 is closed or operates at no load when the switch 12 is open. Alternatively, instead of electrical loading for activation and deactivation of the generator, a mechanical drive may be actively or nonactively coupled for operation of the generator.

Activation of the switch 12 is effected by means of a microprocessor-based logic module 14. The logic module includes a series of inputs, which are represented, for example, by the reference numerals 18, 20, 22. The logic module 14 via inputs 18, 20, 22 receives information in the form of electrical signals about various operating parameters of the internal combustion engine. For example, a data value representative of the engine speed, n, may be input to the logic module 14 at input 18, the value of the partial vacuum, P, in the intake manifold which varies with the engine load may be input to the logic module 14 at input 20, and information about the transmission ratio may be input to the logic module 14 at input 22. The data values described above may be obtained using conventional sensor and monitoring apparatus well known in the field of I.C. engine control. Other or different engine operating parameters relating to engine operation and efficiency may also be monitored and input to the logic module 14 as desired.

ROM 16 has stored therein an engine consumption characteristic map which contains characteristic map points associated with the operating state of the engine at any particular time.

In accordance with the data values or signals received at inputs 18, 20, 22, the logic module 14 selects a corresponding characteristic map value which contains information about the additional power consumption resulting from activation of the generator 10. From this information, the amount of fuel required for operating the generator can be determined as described above with reference to FIG. 1. In dependence upon said characteristic map value retrieved from the ROM 16, the logic module 14 decides whether or not to open or close the switch 12 for operating a generator 10.

In a preferred embodiment, the charge level of the battery is also monitored since it is a central and absolute requirement that the traction battery 8 remain charged. If the battery charge drops below a predetermined level then the generator 10 is connected or prevented from being disconnected regardless of the present operating point of the engine. That is, if the battery has been discharged to an excessive degree the generator will be activated (i.e. loaded) even if the engine is operating at a point of high efficiency. Accordingly, a conventional battery check circuit 9 is provided. The battery check circuit 9 monitors the charge level of the battery 8 by calculating the difference between the discharging current and the charging current of battery 8 and reports this information to the logic module 14. Alternatively, it is also possible to regulate the charge voltage of the battery 8 in dependence of the value of the current for charging or discharging.

In an alternate embodiment a time factor is used to avoid excessively switching the generator from a loaded to an unloaded state. The operating state leading to the connection or the disconnection of the generator from the load circuit must exist for a predetermined period of time before a switching command can be relayed to the switch means. In this manner, frequent connection and disconnection of the generator is avoided. A detecting means may be used to determine the operating state of the engine at any particular time. A hysteresis characteristic for connection and disconnection of the generator may also used to avoid excessively frequent switching.

The preferred and alternate embodiments described are particularly suitable for use in a hybrid vehicle which is driven under certain operating conditions, e.g. in urban traffic, by an electric motor and under other operating conditions, e.g. in interurban traffic and at higher speeds, by an internal combustion engine. In such a hybrid vehicle, a generator which is usually independent of a generator which supplies power to current-consuming equipment required during i.c. engine operation, charges the batteries which are utilized for electric motor operation. This generally requires considerable quantities of electric charge to be made available so that purposeful selection of the operating states in which the electric charge is to be generated by the internal combustion engine may lead to quite substantial savings in fuel.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A computer-based method for controlling a generator associated with an internal combustion engine wherein the generator is operated to provide electric power only during specific operating conditions of the internal combustion engine, said method comprising the steps of:
    a) storing an engine consumption characteristic map in a ROM, said engine consumption characteristic map having a first family of curves representing identical specific fuel consumption and a second family of curves representing identical power output;
    b) inputting to a control module a plurality of signals which represent a plurality of engine operating parameters;
    c) selecting an engine operating point from said engine consumption characteristic map corresponding to said signals input to said control module;
    d) determining from said selected engine operating point a power consumption value corresponding to the amount of fuel required to activate said generator; and
    e) selectively activating and deactivating said generator in dependence of said determined power consumption value.

2. The method for controlling a generator as in claim 1 wherein said step of selectively activating and deactivating said generator further includes the steps of:
    a) activating said generator when said selected operating point lies in a region of low engine efficiency; and
    b) deactivating said generator when said selected operating point lies in a region of high engine efficiency.

3. A method for controlling a generator as in claim 2 wherein said plurality of engine operating parameters includes engine speed data, engine load data and transmission ratio data.

4. A method for controlling a generator as in to claim 3, further including the steps of:
    a) monitoring a charge level of said battery associated;
    b) determining if said charge level is below a predetermined battery charge threshold value; and
    c) activating said generator to power said battery if said charge level is below said threshold value irrespective of the selected engine operating point.

5. A method for controlling a generator as in claim 1 wherein said plurality of engine operating parameters includes engine speed data, engine load data and transmission ratio data.

6. A method for controlling a generator as in claim 5, wherein said generator is used for charging a battery associated with an electric drive portion of a hybrid motor vehicle and which further including the steps of:
    a) monitoring a charge level of said battery associated;
    b) determining if said charge level is below a predetermined battery charge threshold value; and
    c) activating said generator to power said battery if said charge level is below said threshold value irrespective of the selected engine operating point.

* * * * *